ELECTRONIC SIGNALING SYSTEMS

Filed March 4, 1953 7 Sheets-Sheet 1

INVENTOR
John V. Atanasoff
By: Watson, Cole, Grindle & Watson
ATTORNEYS

INVENTOR
John V. Atanasoff

By: Watson, Cole, Grindle & Watson

ATTORNEYS

INVENTOR
John V. Atanasoff

By: Watson, Cole, Grindle & Watson
ATTORNEYS

Nov. 1, 1960 J. V. ATANASOFF 2,958,866

ELECTRONIC SIGNALING SYSTEMS

Filed March 4, 1953 7 Sheets-Sheet 4

INVENTOR

John V. Atanasoff

By: Watson, Cole, Grindle & Watson

ATTORNEYS

INVENTOR
John V. Atanasoff

By: Watson, Cole, Grindle & Watson

ATTORNEYS

Nov. 1, 1960 J. V. ATANASOFF 2,958,866

ELECTRONIC SIGNALING SYSTEMS

Filed March 4, 1953 7 Sheets-Sheet 6

INVENTOR

John V. Atanasoff

By: Watson, Cole, Grindle & Watson

ATTORNEYS

INVENTOR
John V. Atanasoff
By: Watson, Cole, Grindle & Watson
ATTORNEYS 2,958,866

ELECTRONIC SIGNALING SYSTEMS

John V. Atanasoff, Rockville, Md., assignor, by mesne assignments, to Aerojet-General Corporation, Azusa, Calif., a corporation of Ohio Filed Mar. 4, 1953, Ser. No. 340,271

8 Claims. (Cl. 343—112)

This invention relates to a method and apparatus whereby geometrical parameters, defining the interrelation of two relatively moving objects may be determined, and contemplates the coding, transmitting, and/or analyzing of information useful in such determination.

The invention is of primary utilization in the military arts where missiles are fired at targets, as for instance, when such targets are aerial in character, but is generally useful in the analysis of the relative motion of any two moving objects, or of a moving and a fixed object.

One object of the invention is to determine the distance of closest approach of two objects such as missile and target.

Another object of the invention is to provide other geometrical information concerning the passing of two objects such as angle of approach and relative velocity.

A further object of the invention is to provide this and other useful information so coded at an intermediate stage as to permit easy recording and/or telemetering of the information as circumstances require.

Other objects and advantages of this invention will appear in the course of the following description.

Figures 1, 2:
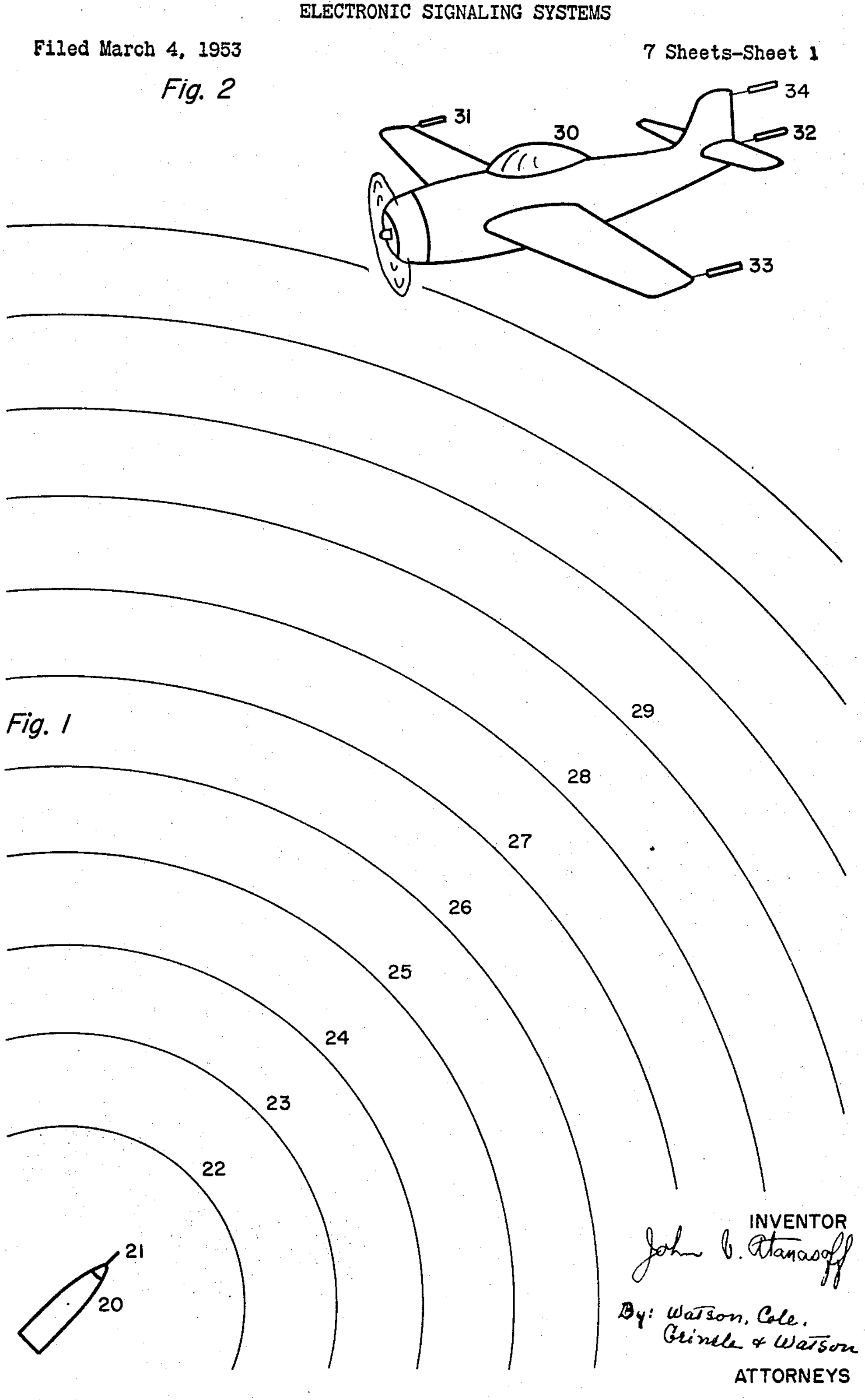
Figure 3:
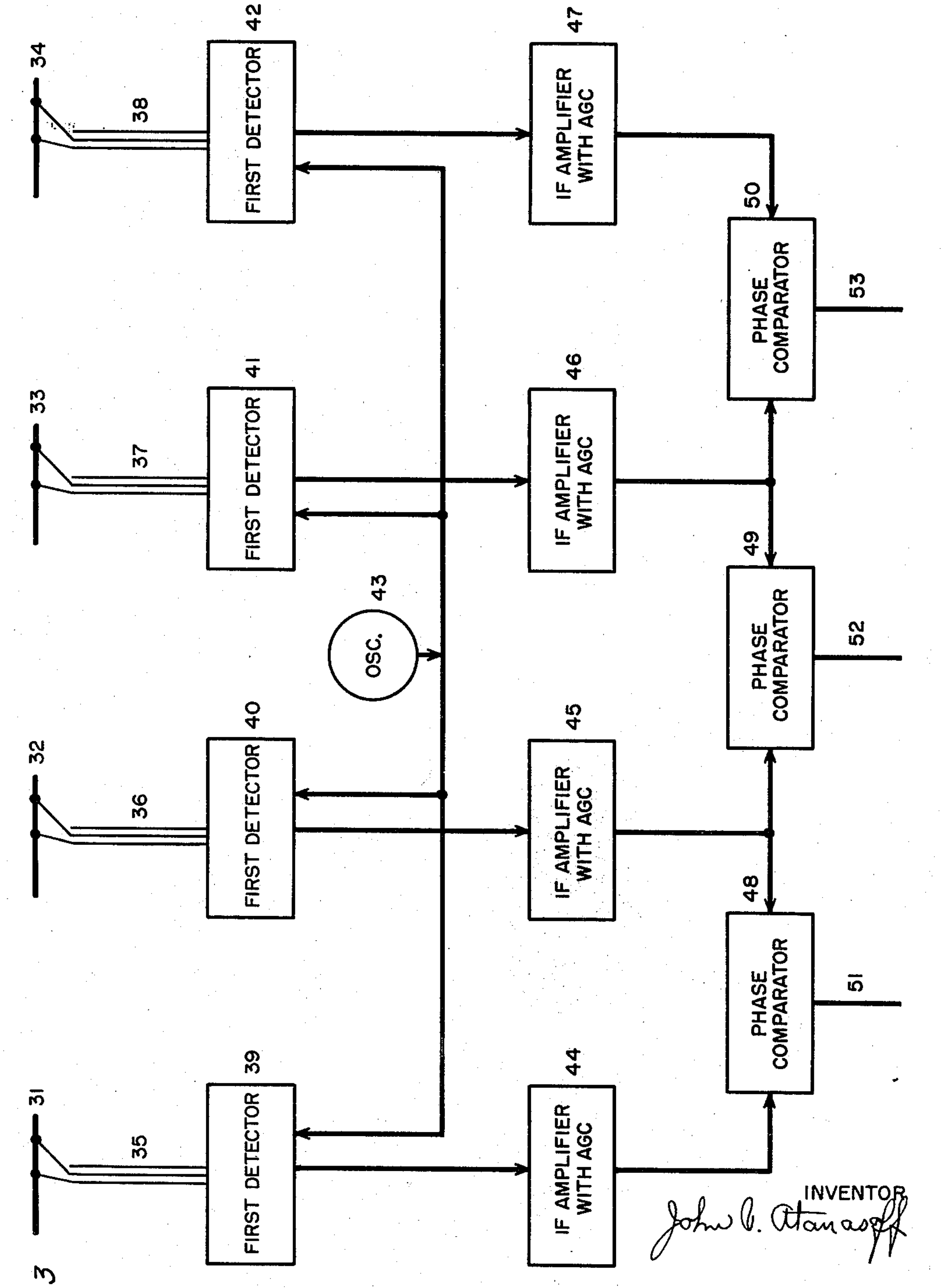
Figure 4:
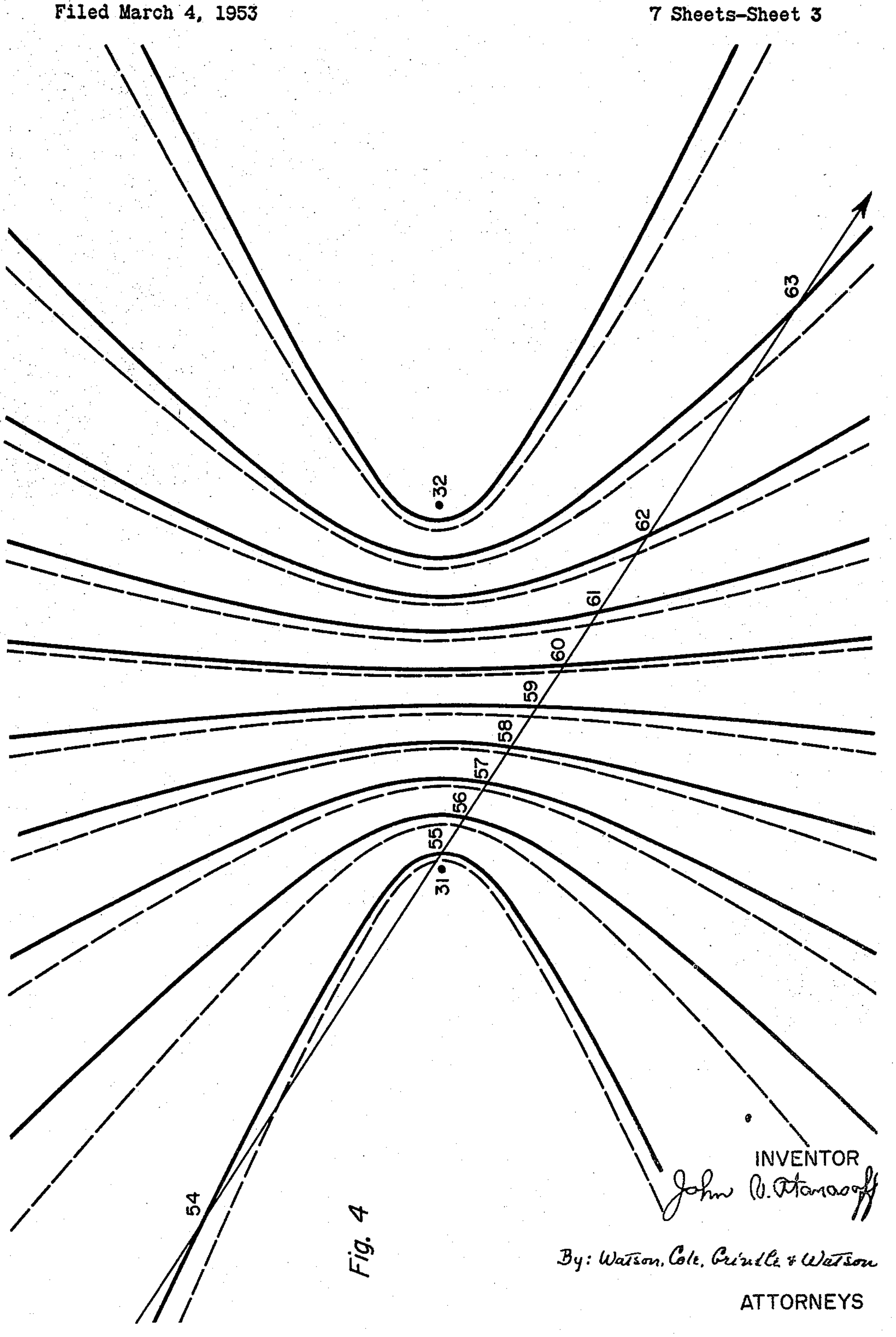
Figure 5:
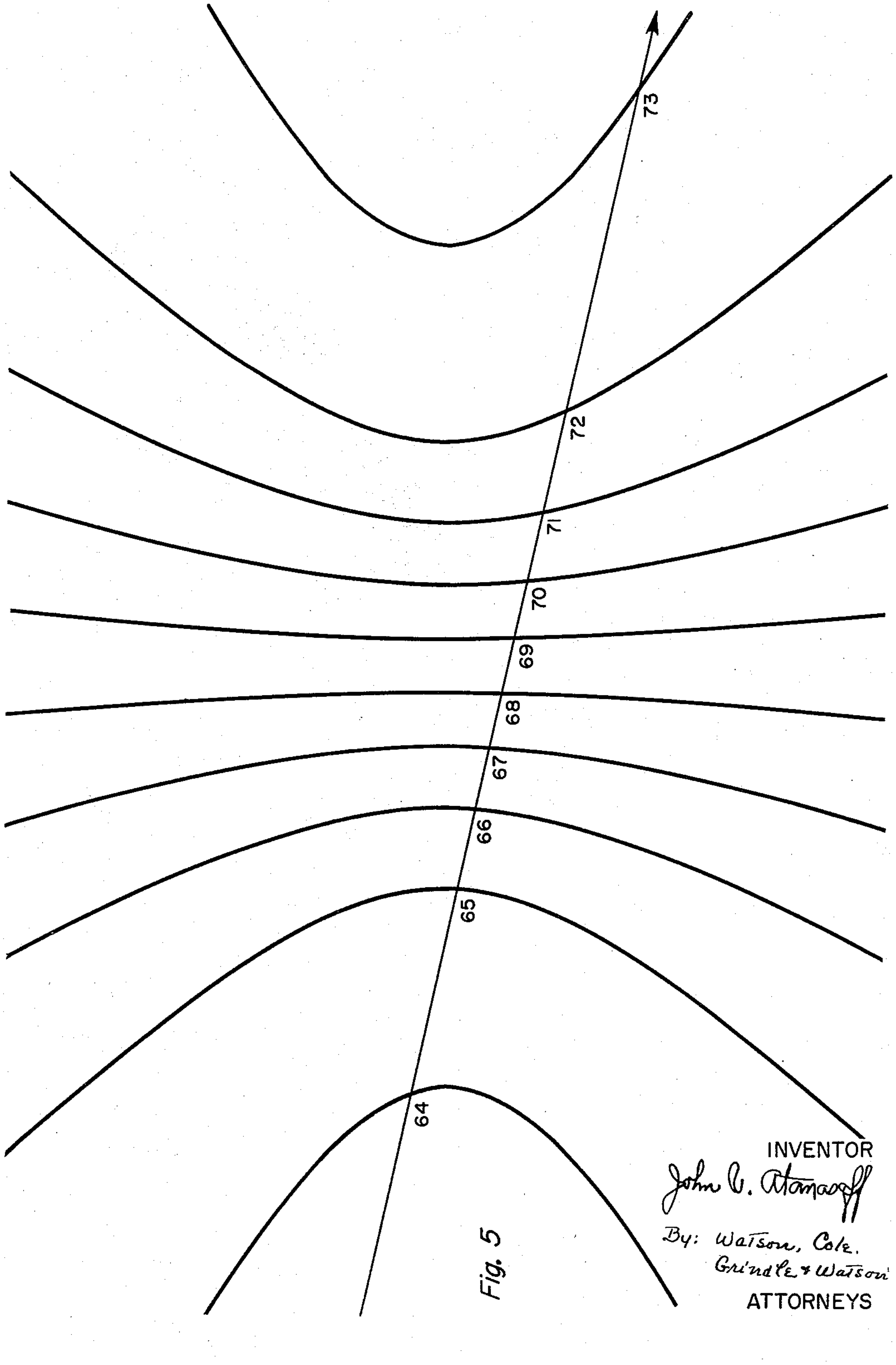
Figure 6:
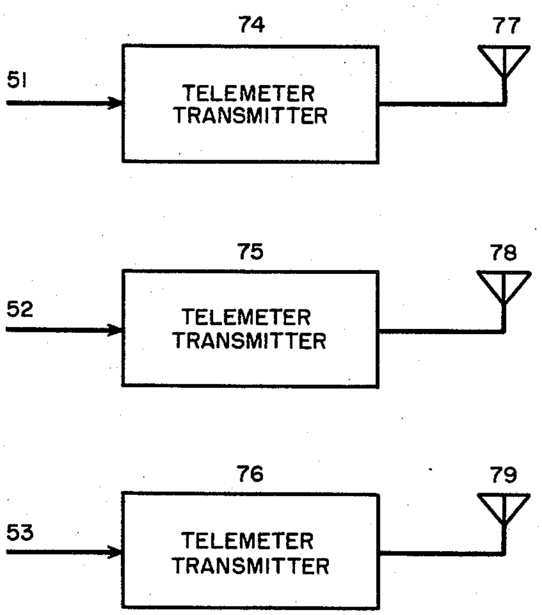
Figure 7:
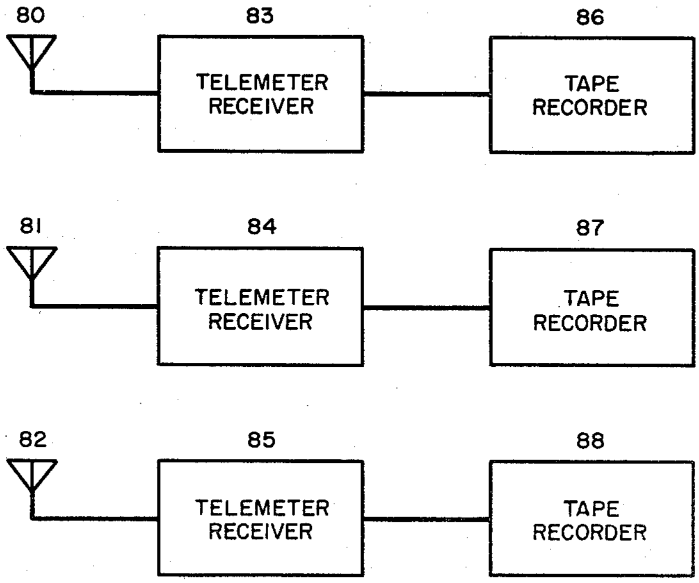
Figure 8:
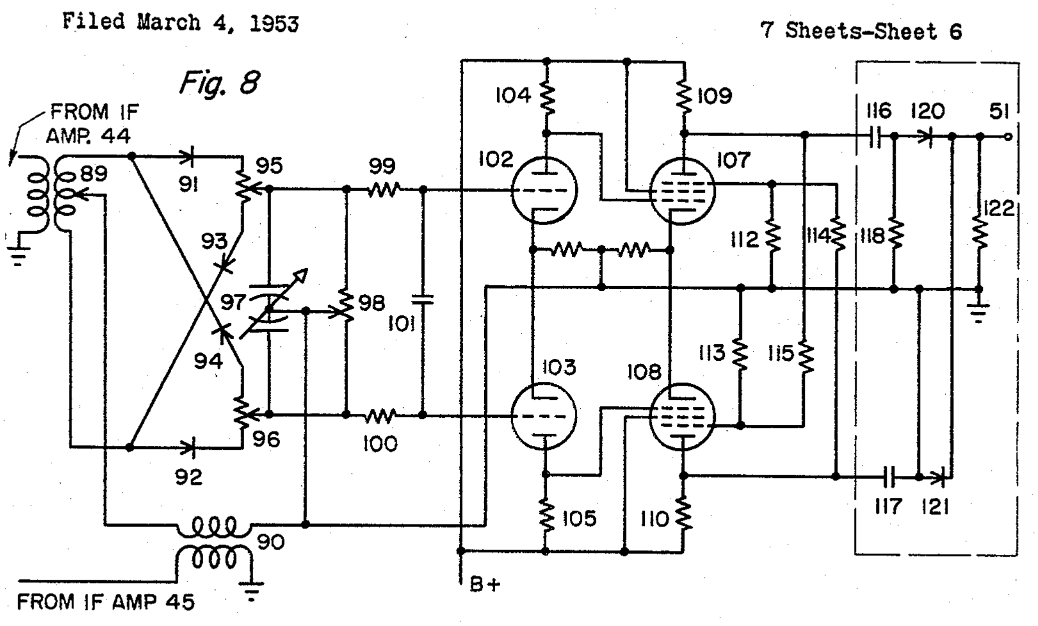
Figure 9:
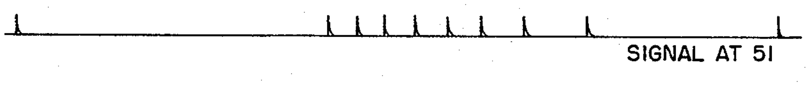
Figure 10:
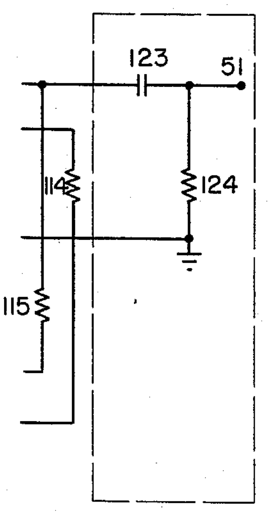
Figure 11:
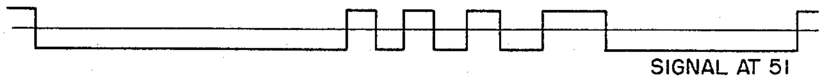
Figure 12:
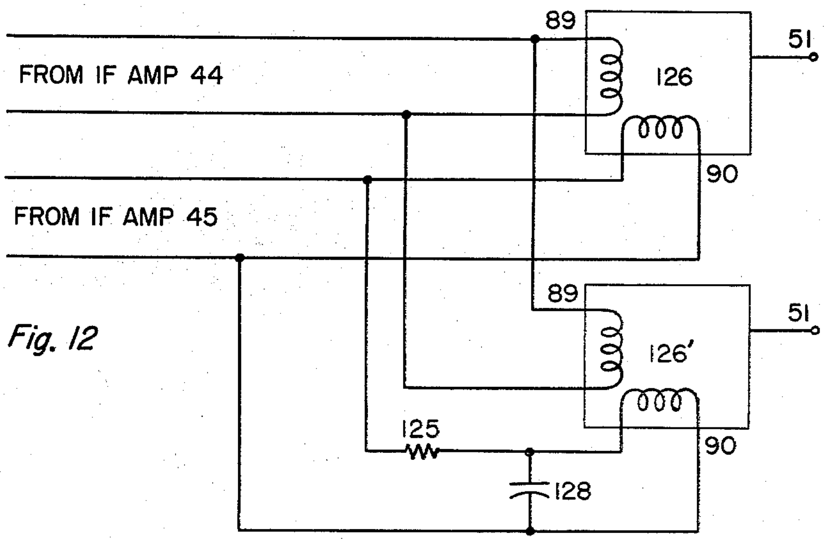
Figure 13:
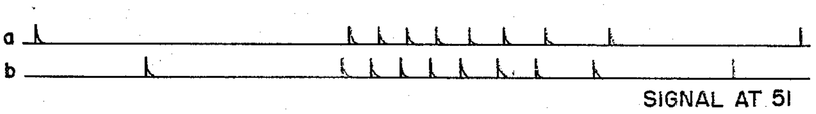
Figures 14, 15:
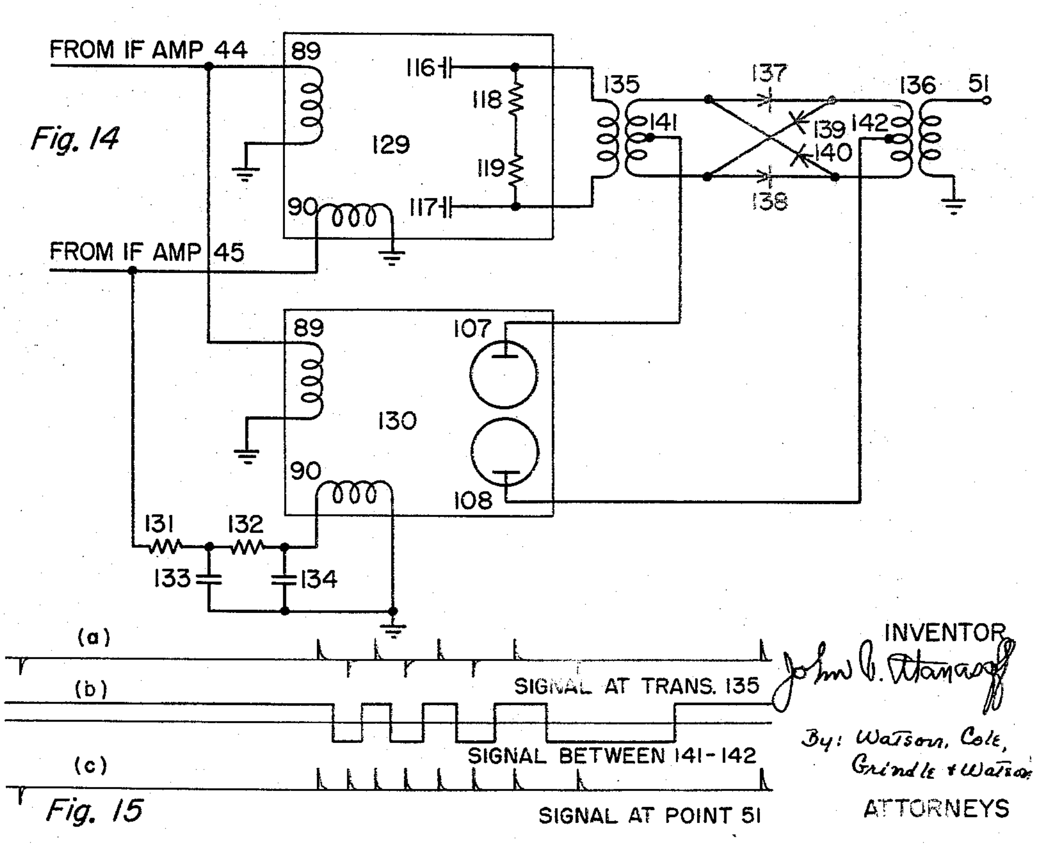

In the accompanying drawings forming a part of this specification in which the same numerals are employed to designate the same parts throughout, Figure 1 is a perspective of a missile containing a radio frequency generator and radiating antenna, Figure 2 is a perspective view showing preferred locations for the required receiving antennas upon the target aircraft or drone, Figure 3 is a block diagram illustrating the major part of a system embodying the invention, Figure 4 shows a series of curves representing intersections of a certain family of confocal hyperboloids of revolution with a geometrical plane passing through the foci of the family of curves, Figure 5 shows curves representing the intersections of the same family of hyperboloids with another plane not passing through the foci, but at some distance $h$ therefrom and parallel to the axis of the hyperboloids, Figure 6 is a block diagram of a telemetering transmitter modulated by signals from a plurality of electronic devices called for convenience "comparators," and transmitting them to another location such as a ground station, Figure 7 is a telemetering receiver and a recorder to record the signals generated by the comparator and transmitted by the telemetering equipment, Figure 8 is a schematic diagram giving the electronic details of a preferred form of the comparator indicated in Figure 3, Figure 9 illustrates the signal at terminal 51 when the circuit of Figure 8 is used, Figure 10 is a schematic drawing representing an alternative preferred arrangement of the comparator circuit, Figure 11 illustrates the signal at terminal 51 when the circuit of Figure 10 is used, Figure 12 represents another alternative preferred arrangement of the comparator circuit, Figure 13 illustrates the signals at terminals 51 when the circuit of Figure 12 is used, Figure 14 represents still another alternative preferred arrangement of the comparator circuit, Figure 15 illustrates the signal at terminal 51 when the circuit of Figure 14 is used.

In the detailed description of the invention, it will be assumed that the relative vector velocity of the two objects is a constant vector. As will be seen, this is not a required condition to permit the use of the invention as an effective method and means of determining the geometrical parameters interrelating the two bodies which are passing each other, provided the motion is reasonably regular. None the less, it is an assumption which simplifies the explanations and applications of the method and it is also an assumption which is closely enough approximated by many cases of interest to which this invention may be applied. Thus, if an antiaircraft missile is fired at a target aircraft, the principal portion of the relative trajectory of interest is that portion during which missile and target aircraft are less than 200 feet apart. During this relatively short portion of the trajectory of both missile and target aircraft, the assumption that their relative velocity is a constant vector will not be in appreciable error.

The drawings illustrate one or more preferred embodiments of this invention.

In Figure 1, the missile 20 is provided with a radio frequency generator, that is, an oscillator of substantially constant frequency. The magnitude of this frequency is not critical, but a preferred frequency is in the range from 50 to 400 megacycles per second. The probe 21 represents the antenna, or may represent a capacitative coupling element to couple the radio frequency generator into the missile body, which acts as antenna in this latter case. From the missile the radio frequency energy spreads outward with the speed of light and the amplitude, polarizations, and phase at each point in space are determined by the well-known Maxwell theory. The surfaces of constant phase, the so-called "phase surfaces," are of a general spherical shape surrounding the missile, the exact shape depending upon the form of the transmitting antenna. However, if the antenna is a dipole which is short compared with the half wave length, then the surfaces become effectively spherical at relatively short distances from the center of the antenna. In the preferred form the present invention employs an antenna as small as practical in order to secure phase surfaces that are effectively spheres about the transmitter. A further requirement is that the antenna structure shall not possess helical symmetry or have any form capable of yielding circularly polarized waves. The same considerations apply to both transmitting and receiving antennas.

In Figure 1, the curves 22 to 29 represent the intersection of the phase surfaces with the plane of the drawing.

The outline of a possible target aircraft 30 is illustrated in Figure 2. Mathematically, it is assumed that this body carries all coordinate framework in terms of which the parameters of motion of the missile are to be specified. Physically, this is accomplished by attaching to the target aircraft certain small receiving antennas 31, 32, 33, 34. The number of these antennas required will depend upon the information which it is desired to obtain from the system, ordinarily at least three will be employed, and four are necessary to yield all pertinent geometrical information of the interrelationship of the two bodies. These antennas are illustrated in preferred positions, the considerations being that these antennas should be sufficiently spaced to yield strong triangles with the instantaneous position of the missile and also be so placed that the metallic substance of the target aircraft shall have as little influence as possible on the transmission of waves from the missile to the antennas. This will be accomplished by placing the antennas in the open and so relating them to the body of the target aircraft that the larger surfaces thereof will not reflect and focus energy from the missile. Under these conditions the energy received by the antennas is largely transmitted through the direct wave from the missile to the antennas and the phases of the received radio waves are closely related to the distances between the receiving antennas and the missile according to the known laws of electrodynamics.

In Figure 3, signals received by the four receiving antennas 31, 32, 33, 34 are carried by concentric transmission lines 35, 36, 37, 38 to the first detectors 39, 40, 41, 42. In these first detectors, radio frequency from a common oscillator 43 heterodynes the signals into lower frequencies which are then transmitted to intermediate frequency (IF) amplifiers 44, 45, 46, 47 respectively, each with automatic gain control. The difference in the frequencies of the source 21 and the common local oscilator 43 falls within the pass band of the IF amplifiers 44, 45, 46, 47. It will be appreciated that this part of the system is entirely conventional and may be altered as desired.

The phases of the IF amplifiers are now compared in pairs by separate comparators; thus the comparator 48 may compare the phases of amplifiers 44 and 45, the comparator 49 may compare the phases of amplifiers 45 and 46, and the comparator 50 may compare the phases of amplifiers 46 and 47. It should be noted that the illustrated choice of pairs of antennas is arbitrary, and they can be compared in any desired combinations. For instance, each of the remaining antennas could be compared with a single one. Certain considerations which make some comparisons more practical than others will appear in the course of the following description. Each comparator compares the phase of two signals and, at each instant when some predetermined phase relation is satisfied, emits an electrical pulse. A preferred device by which such function can be accomplished is illustrated in Figure 8 and alternative preferred devices in Figures 10, 12 and 14. Each will be the subject of further and more detailed discussion.

In order to explain the operation of this invention, it will be convenient to consider antennas 31 and 32, the outputs of which are compared in comparator 48. The phase received by each antenna will depend upon its distance from the transmitter on the missile. When the missile assumes certain particular positions, the phases of the received signals will bear the relation characteristic of the comparator and the comparator will emit a pulse along channel 51. The loci of all points at which this will occur form a family of confocal hyperboloids of revolution in space. The number of the hyperboloids between the foci depends upon the spacing of the antennas and the wave length corresponding to the frequency of the transmitter on the missile. It also depends upon the conditions upon which a pulse is generated by the comparator. The comparator of preferred design, which is described later, will emit a pulse when the incoming signals are in phase quadrature. Under these conditions the number of hyperboloids between the foci is effectively $4S/\lambda$ in which S is the spacing between the antennas and $\lambda$ is the wave length.

Figure 4 represents the traces of the family of confocal hyperboloids of revolution on a plane passing through the foci or two antennas which are here taken to be numbers 31 and 32. If the projectile is in the plane of Figure 4, and pursues a path along the line 54—63, at each point where it crosses one of the curves the comparator will emit a pulse. This will occur at the points 54 to 63. If the projectile is moving at a constant velocity, it will be seen that the pulses will be spaced in time proportionally as the points are spaced in distance along the line 54—63. If these pulses are recorded on a recorder tape moving at uniform speed, the spacing of these points will indicate the line along which the missile travels.

Most trajectories of the missile as observed from the target aircraft will not intersect the line joining the two antennas in question (or an extension thereof) which, of course, is the axis of the family of confocal hyperboloids. For these cases, consider a plane containing the trajectory and also parallel to the line joining the two antennas. The hyperboloids intersect this plane in the curves of Figure 5. Suppose 64—73 is the new trajectory in question. At each point where the missile crosses one of the curves in Figure 5, that is, at the points 64, 65, 66, etc., the proper phase relationship will exist between the signals received at the two antennas 31 and 32 and comparator 48 will emit a pulse. When these pulses are recorded on a recorder running at uniform speed, the spacing of these points on the record will be proportional to the intervals of the corresponding points along the line 64—73 and this record will describe the trajectory 64—73 although not uniquely. To understand that this description is not unique, it is only necessary to observe that all trajectories obtained by revolving the line 64—73 about the foci of the hyperboloids will have the same recorder record if they are described with the same velocity. In order to make the description unique, it is necessary to compare the phase of the signals received by more than one pair of antennas; that is, to employ and anlyze more than one recorder record. The exact way in which several recorder traces are employed to completely determine all geometrical parameters of the interaction will be described in detail hereinafter.

In Figure 6 the pulse output of the comparator 48 appears on channel 51. This signal is used to modulate the output of transmitter 74; likewise, the signals carried in channels 52 and 53 are used to modulate the output of transmitters 75 and 76 respectively. Thus three radio frequency signals are transmitted from antennas 77, 78 and 79 and these signals will be modulated with the pulses derived from comparators 48, 49, and 50 respectively. It is not necessary that these comparators modulate separate transmitters; they may modulate different channels carried over the same radio frequency band. However, if three separate transmitters are employed, they will operate on different frequencies so that the signals are kept separate. Amplitude modulated transmission is preferred, but the use of frequency modulation as an alternative is contemplated.

In Figure 7, the three receiving antennas, 80, 81, and 82 respectively, receive the three transmissions. These signals are amplified and demodulated in the three radio frequency receivers 83, 84, and 85. The output of these receivers, closely resembling the signal originally obtained in the comparators 48, 49, and 50, is recorded on the tape recorders 86, 87, and 88. In these recorders, which can be of any design suitable for the frequency band necessary to reproduce the pulse from the comparators, the signals are recorded on strips. As stated above, these recorder strips constitute the complete record of the interaction between the two bodies, such as between the target and projectile, and when taken together, this record is unique.

One preferred form of the phase comparison device 48, 49, 50, Fig. 3, is shown in detail in Figure 8. The principal part of this device is the balanced modulator made up of four diode rectifiers 91, 92, 93 and 94; coupling transformers 89 and 90; balancing resistors 95 and 96; balancing capacitor 97; and terminating resistor 98. The operation of this section of the circuit is as follows. If it is supposed that Figure 8 represents phase comparator 48 of Figure 3, the output of the IF amplifier 44 fed by antenna 31 is coupled to the modulator by transformer 89, and the output of IF amplifier 45 fed by antenna 32 is coupled to the modulator by transformer 90. The signal levels in the two IF amplifiers are so adjusted that the signal applied to transformer 90 is large enough to control the conductivity of the diodes.

If a signal A sin $wt$ is being radiated from the probe 21 on the missile 20, antenna 31 will receive a signal $a \sin(wt-\alpha)$ and antenna 32 will receive a signal $b \sin(wt-\beta)$, where $\alpha$ and $\beta$ represent the angular delays acquired by the signal in traveling from the radiating probe 21 to antennas 31 and 32 respectively. Modulation of these two signals by the common local oscillator 43 (Figure 3) with angular frequency $w_0$ gives, after filtering out the image frequency component, the IF signals $a' \sin[(w-w_0)t-\alpha]$ and $b' \sin[(w-w_0)t-\beta]$. Or, letting $w_1=(w-w_0)$, the IF signals are, respectively, $a' \sin(w_1t-\alpha)$ and $b' \sin(w_1t-\beta)$. When these signals are coupled to the modulator through transformers 89 and 90, an output signal $$a'k \cos(\alpha-\beta)-a'k \cos(2w_1t-\alpha-\beta)$$

is obtained across the terminating resistor 98. The low-pass filter circuit made up of resistors 99 and 100 and capacitor 101 filters out the high-frequency component $a'k \cos(2w_1t-\alpha-\beta)$ so that the signal across capacitor 101 is $a'k \cos(\alpha-\beta)$. The signal at this point is therefore a voltage which is proportional to the cosine of the phase angle between the signals received by antennas 31 and 32. Following the low-pass filter is a push-pull amplifier made up of vacuum tubes 102 and 103 and resistors 104, 105 and 106, whose function is merely to increase the signal level. Following the push-pull amplifier is a trigger circuit made up of pentode vacuum tubes 107 and 108 and resistors 109, 110, 111, 112, 113, 114 and 115. This trigger circuit is designed to have only two stable states. When the signal grid of tube 107 is positive with respect to the signal grid of tube 108, tube 107, will be fully conducting and the plate current in tube 108 will be cut off; and, when the signal grid of tube 107 is negative with respect to the signal grid of tube 108, tube 108 will be fully conducting and the plate current will be cut off in tube 107. The potential between the plates of tubes 107 and 108 therefore reverses whenever the signal from the modulator passes through zero, that is, whenever $\cos(\alpha-\beta)=0$, or whenever the phase angle between the signals received by antennas 31 and 32 passes through $\frac{1}{2}(2n-1)\pi$, where $n$ is any integer. The peaking circuits made up of capacitors 116 and 117 and resistors 118 and 119 have time constants which are very short and hence effectively differentiate the signal and allow only the passage of a sharp pulse each time that the trigger circuit changes state. The diode rectifiers 120 and 121 allow only the positive pulses passing through either of the two peaking circuits to be applied across the load resistor 122. The output at terminal 51 is therefore a series of positive pulses which occur each time the phase angle between the signals received by antennas 31 and 32 passes through $\frac{1}{2}(2n-1)\pi$. Figure 9 illustrates the output signal obtained with a missile following the trajectory 54—63 shown on Figure 4.

The circuits, components and principles of operation of phase comparators 49 and 50 may be the same as those of phase comparator 48.

Figure 10 illustrates a second preferred system for accomplishing the phase comparison required in this invention. For some applications this system may have certain advantages over the system illustrated in Figure 8. The design and components of the modulator, low-pass filter, push-pull amplifier, and trigger circuit of this second phase comparator, made up of parts 89 through 115, are identical with the corresponding elements in the phase comparator illustrated in Figure 8 and described above. Similarly, the purpose and operation of the elements of Figure 10 are identical with those of the corresponding elements of Figure 8. However, in the circuit of Figure 10, the output of the trigger circuit is coupled to the output terminal 51 and thence to the telemeter transmitter 74 by the R-C coupling 123 and 124, whose time constant is very long compared to the normal time between successive changes of state of the trigger circuit. The output of this comparator is therefore essentially a square wave which is positive when the cosine of the phase angle between the signals received by the two antennas is positive and negative when the cosine of this phase angle is negative. Figure 11 illustrates the output obtained when the missile traverses the trajectory shown on Figure 4.

Another preferred arrangement of phase comparators is illustrated in Figure 12. This may consist of two phase comparators, 126 and 126′, each of which is identical in design and operation to that illustrated in Figure 8 and described above. Comparator 126 is fed directly from IF amplifiers 44 and 45 as was the circuit of Figure 8. Circuit 126′ is also fed from IF amplifiers 44 and 45, but in this case the signal from IF amplifier 45 is delayed by the insertion of the R-C phase shift network made up of resistor 125 and capacitor 128. The magnitude of the phase shift introduced by this circuit is not critical, but a value between 10 and 20 electrical degrees is preferred.

Comparator 126 will therefore have an output which is illustrated in trace (*a*) of Figure 13. This consists of a positive pulse each time that the missile crosses one of the phase surfaces represented by the hyperbolas drawn with solid lines on Figure 4. The effect of the phase shift network 127 and 128 inserted between IF amplifier 45 and comparator 126′ is, in effect, to increase the apparent delay between the radiating probe 21 and antenna 32. This increased delay effectively shifts the phase surfaces away from antenna 32 as represented by the hyperbolas drawn with dashed lines on Figure 4.

The output of comparator 126′ therefore consists of the series of positive pulses illustrated in trace (*b*) of Figure 13. These pulses will either precede or follow the corresponding pulses from comparator 126 depending upon the sense in which the missile crosses the corresponding phase surfaces. This intelligence may be conveyed to the recording equipment on separate telemetering channels or on separate subcarriers on the same channel.

A fourth preferred embodiment for accomplishing the phase comparison is illustrated in Figure 14. This again consists of two comparators 129 and 130. Comparator 129 consists of coupling transformers, modulator, low-pass filter, amplifier, trigger circuit, and peaking circuits, comprising components 89 through 119, identical in design and operation with the circuit illustrated in Figure 8. Comparator 130 consists of coupling transformers, modulator, low-pass filter, amplifier and trigger circuit comprising components 89 through 115, identical to the corresponding circuits and components illustrated in Figure 8. The modulator of circuit 129 is fed directly from the outputs of IF amplifiers 44 and 45 as was the circuit of Figure 8.

The modulator of circuit 130 is also fed from IF amplifiers 44 and 45, but in this case the phase of the signal from IF amplifier 45 is delayed by the phase shift network made up of resistors 131 and 132 and capacitors 133 and 134. While the magnitude of this phase shift is not critical, a value between 45 and 90 electrical degrees seems desirable.

Examination of Figure 8 and the associated description of operation show that the signal output of comparator 129 applied across the primary of transformer 135 is a series of positive and negative pulses as the phase between the signals received by the two antennas passes through the angles of $\frac{1}{2}(2n-1)\pi$.

Specifically, if the missile is following the trajectory indicated on Figure 4 and is proceeding in the direction of increasing numbers, there will be a negative pulse at intersection 54, a positive pulse at intersection 55, a negative pulse at 56 and so on. This output is illustrated in trace (*a*) of Figure 15. If the missile is moving in the reverse direction, the polarity of the pulse at any intersection will be reversed.

Similarly a study of Figure 8 and the accompanying description will show that the output of comparator 130, expressed as the potential at point 141 with respect to that 142, will be positive when $\cos(\alpha-\beta-\sigma)$ is positive and negative when $\cos(\alpha-\beta-\sigma)$ is negative, where $\sigma$ is the phase delay introduced by the R-C network 131 to 134. Therefore the potential of point 141 with respect to point 142 will be positive while the radiating probe 21 is in the vicinity of the hyperbola (Figure 4) containing intersections 54 and 55, negative while in the vicinity of the hyperbola containing intersection 56, positive in the vicinity of the next hyperbola and so forth. Trace (*b*) of Figure 15 illustrates this output for trajectory 54 to 64.

In Figure 14, the connections to the rectifiers 137, 138, 139, and 140 are such that a pulse applied to the primary of transformer 135 is transmitted to the output terminal 51 without change when point 141 is positive with respect to point 142, but it is transmitted to 51 with reversed polarity when point 141 is negative with respect to 142.

The output from terminal 51 obtained when a missile traverses the trajectory on Figure 4 in the direction of increasing numbers is therefore a negative pulse at intersection 54 and a series of positive pulses at intersections 55 to 63. Traversing this trajectory in the reverse direction would give a series of negative pulses at intersections 63 to 55 and a positive pulse at intersection 54. The circuit of Figure 14 therefore distinguishes the way in which the missile crosses a phase surface by the polarity of the pulse emitted. The output from terminal 51 for a missile following the trajectory of Figure 4 is illustrated in trace (*c*) of Figure 15.

*Analysis of records*

In explaining the analysis of records to obtain mathematical data in any form desired, it will first be necessary to give the mathematical and geometrical considerations involved. The explanation will be concluded by giving a description of the actual procedures of analysis. Suppose in Figure 2 that the antennas 31, 32 and 33 form an isosceles triangle so that the distance 31—32 equals the distance 32—33. We shall suppose that the analysis proceeds principally by comparison of the phases of the signal received by antennas 31, 32 and 33. It will be seen that the role that antenna 34 will play in the analysis will be relatively rudimentary. Since the distance between the antennas, for instance 31—32, is known and since the wave length of the oscillator is also known, a family of curves similar to Figure 4 can be prepared. The only uncertainty in the preparation of this family will be the unknown electrical lengths of the transmission lines from the antennas to the receivers. By using standard telescoping coaxial line-sections ("line-stretchers"), we may make these electrical lengths equal or arrange them so that they differ by an integral number of half wave lengths. In this case the curves are arranged symmetrically about the point midway between the two antennas, and no curve passes through this point. This is the case in Figure 4. In order to have a complete picture of the hyperboloids in space, it will be necessary to prepare not only the family of curves of Figure 4, but a number of families of curves obtained from the intersections of the hyperboloids of revolution with planes which are parallel to but are at successively greater distances from the plane of Figure 4, which passes through the foci. These curves are illustrated by Figure 5, which is drawn at a distance *h* equal to one-half the spacing between the antennas 31 and 32. The number of families of curves which it will be necessary to draw, will depend upon the desired accuracy of the analysis. We will suppose that the scale of this system of drawings is $\gamma$. Since the drawings will be much smaller than conditions in actual space, $\gamma$ will be a small fraction.

Now consider the recorder record from tape recorder 86 which is ultimately derived from phase comparator 48 which compared the signals from antennas 31 and 32. The scale $\delta$ of this record is given by the formula $$\delta=\frac{s}{v}$$

in which *s* is the paper speed of the recorder and *v* is the relative velocity of projectile and target, and it is supposed that each of these quantities be measured in the same units. If it should happen that the scale $\delta$ of the record exactly equals the scale $\gamma$ of the curve families, and if the distance of closest approach of the trajectory to the axis of the antennas were identical to that of a certain family of the series, it would be possible to fit the recorder tape accurately on that family in a position similar to the line 64—73 of Figure 5. All the points on the record would coincide with the various points of intersection as at the points 64, 65, 66, etc. It will be noted that when this coincidence is obtained, the following three data are also obtained: (1) The shortest distance of the trajectory from the axis of the antennas *h*; (2) The angle $\phi$ which the trajectory makes with the projected axis of the antennas; and (3) The intercept of the trajectory (the distance between the projection [on the plane of the trajectory] of the midpoint between the foci of the hyperboloids and the intersection of the trajectory with the projected line joining the foci). The fact that three variables are determined from a single fit is not surprising since this fit corresponds to the coincidence of all the points 64, 65, 66, etc., and this number of points may be very large. Thus, if the distance between the antennas were ten meters and the wave length one meter, there would be 40 points involved in matching the recorder record to one of the families of curves. It is observed that these three data are tremendously over-determined and it is also observed that an accident which causes one of the dots in the recorder tape to be missing or displaced will not much affect the result.

If, as is usually the case, the scales $\gamma$ and $\delta$ are not equal, the recorder trace will not fit anywhere on any family of curves. Then it will be necessary to increase or decrease the scale of the recorder record or of the family of curves until a match is obtained. It will be noted that when this is achieved, since $\gamma$ is known and $\gamma=\delta$, $$\delta=\frac{s}{v}$$

will be known. Since the speed *s* of the recorder is a known quantity, the relative velocity of the projectile and target is determined by the required adjustment of scale.

It is a fact of mathematics that a line in space requires a knowledge of four numbers or parameters to determine it completely. Since only three quantities are determined in the procedures described above, it is obvious that this does not quite determine the line in space. By repeating the above process with the recording obtained from another pair of antennas, for instance 32 and 33, it will be possible to determine three more quantities. The procedure in obtaining these three quantities is identical to that above, and, as a matter of fact, it can proceed with the same families of curves since as above stated the spacing between the antennas 31 and 32 is the same as the spacing between antennas 32 and 33. By analyzing two recorder traces from three antennas, we have determined six quantities and these quantities are sufficient to determine the trajectory in space, since mathematically speaking, this only requires four quantities. We have a situation where the position of the line of the trajectory in space is over-determined. This is helpful because it enables the position of this line to be determined and checked in several ways. It is obvious that if the whole procedure is correct, the relative speed of the projectile and target obtained by the two analyses must also coincide and this coincidence is another check.

In spite of the fact that the position of the trajectory is over-determined, there is yet a two-fold ambiguity in this position. This can be seen in the following way. So far only three antennas have been used. These three antennas determine a plane. By using only three antennas, it will be impossible to determine whether the trajectory is in any given position or in the position obtained by reflecting it in the plane of the three antennas. The role of the fourth antenna is now clear. It is outside of the plane of the three antennas and hence permits a determination of which actual position the trajectory occupies. The method of this determination is precisely like the previous calculations. If the phases of antennas 33 and 34 are compared, the resulting recorder record will permit additional calculations which will yield the desired information. It should be remembered, however, that to make the calculation conveniently, the distance 33—34 must be identical with the distances previously used, i.e., the distances 31—32 and 32—33.

The determination of the actual trajectory position according to any scheme that is desired from the six quantities determined above, is a problem in trigonometry and geometry and will not be discussed at the present time. The exact nature of this calculation will depend primarily on the use to which the results will be put.

In order to carry out the above procedures as expeditiously as possible, a preferred method is as follows: The families of curves, each properly labled to show its distance from the axis of the hyperboloid, are arranged upon a strip film for projection. The projector to be employed is of the autofocusing variety and is provided with a scale which indicates the enlargement at each position. The screen on which projection takes place is arranged horizontally as is common when enlarging negatives. The tape recording is laid across the screen. By manipulating the position of the recorder strip and the scale of the projection, and by changing the family of curves projected, it will be possible to obtain a near fit for any recorder trace which comes within the range of the families of curves. If the speed of the recorder is fixed and the antenna distance and wave length are also fixed, it will be possible to have the enlargement scale read directly in relative velocity of trajectory and target. The shortest distance $h$ between the trajectory and the line joining the two antennas is immediately read from the family of curves with which a fit is obtained, or if no family gives a sufficiently precise fit, a mental interpolation between two adjacent families is possible. The other two parameters $\phi$ and $\mu$ are easily measured as the recorder trace rests upon the projector easel.

The circuit of Figures 12 and 14 together with the recorder records Figures 13 and 15 illustrate in two alternative forms an improved form of recording which yields in a very simple way additional information to aid in the analysis of the records. To understand how this is true, imagine at first that the trajectory passes through the center of either Figure 4 or 5. One notes that the number of intersections of the trajectory with the hyperbolas varies from 0 to 10 depending upon the angular position of the trajectory. It is true that the angular position is only approximately determined by the number of dots, but if the number of hyperbolas were greater, this number would be more accurately determined. After the angle $\phi$ of the trajectory is determined, imagine that the trajectory be shifted to the right or left so that the intercept is positive or negative. In either case the number of intersections of the trajectory with the hyperbolas is increased by 2 every time the trajectory adds a double intersection with one of the hyperbolas. Thus, if the number of intersections were at first 4, it would increase successively to 6, 8, etc. It will be noted that each of the additional curves intersected will be crossed by the trajectory in both directions. If the recorder record can be arranged to provide a means for indicating which direction the hyperbolas are crossed, the 8 intersections mentioned above could be written as 6—2 (meaning that in six intersections the curves are crossed from left to right, and in two intersections the curves are crossed from right to left). The algebraic difference indicated is 4 and this determines the angular position of the line. The —2 of the expression above indicates that the line has been translated parallel to itself until it intersects 2 additional curves. Thus the position of the line on the families of hyperbolas is almost entirely determined by counting the number of crossings in each direction.

As explained above, the effects of Figures 12 and 14 are to produce records of Figures 13 and 15 which depict the direction in which the trajectory crosses the various phase surfaces. In Figure 13 two traces are recorded and the sense of the crossing is determined by ascertaining whether the pulse on the second trace follows or precedes the pulse on the first trace. The record of Figure 15 depicts the direction of crossing by indicating one direction of crossing by a positive pip and the other by a negative one. From either trace the signature can easily be read in the form 9—1 which characterizes the position of the trajectory in Figure 4. By observing the signature of trace, one can tell almost precisely where to try to fit the trace upon the families of curves, and the distance $h$ of the particular family from the axis as well as the scale becomes the principal variables. The employment of the circuits 12 and 14 in the method outlined here constitutes a valuable aid in the reduction of data.

In order to simplify the description of the invention and to facilitate an understanding of the purposes thereof, reference is made herein to a special application of these principles, in which the relationship of two rapidly moving aerial objects is compared, and data in the form of signal pulses is transmitted to a ground station for interpretation. It will be appreciated, however, that the invention has many and varied applications, and is useful generally in the field of signal transmission, and particularly in determining the velocities and paths of moving objects, or the velocity and path of a single moving object with respect to a stationary position.

The transmission of coded intelligence whereby the accuracy of firing a projectile at a moving target may be determined from the ground, even where the target may be destroyed immediately after such transmission has occurred is, of course, a matter of the utmost importance in researching pertaining to ordnance.

It will also be understood that although, for convenience in describing the invention, reference is made to preferred systems and preferred circuit components of such systems, such alterations and modifications of the illustrated embodiments are contemplated as would normally occur to those skilled in the field of electronic signaling.

Having thus described the invention, what is claimed as new and desired to be secured by Letters Patent is:

1. In a method of determining geometrical parameters defining the interrelation of two relatively moving objects, the steps which comprise transmitting wave form signal energy from a first of said objects, receiving the transmitted energy concurrently at not less than three spaced points on the second of said objects, generating, in response to the received signal energy, signals varying significantly upon the recurrence of a predetermined phase relationship between the signal energy received at selected pairs of said points, recording said last named signals, and visually comparing said recorded signals with a plurality of curves constituting the loci of points in space from which signal energy radiated to the last named reception points will be received in the said predetermined phase relationship.

2. In a method of determining the distance at closest approach between two relatively moving objects, the steps which comprise transmitting wave form signal energy from a first of said objects, receiving the transmitted energy concurrently at not less than three spaced points on the second of said objects, generating, in response to the received signal energy, signals varying significantly upon the recurrence of a predetermined phase relationship between the signal energy received at one of said points and the signal energy received at each of two other points, recording said last named signals, and visually comparing said recorded signals with a plurality of sets of curves, of which the curves in each set represent the intersection of a plane with a plurality of confocal hyperboloids of revolution having two of said reception points as foci and constituting the loci of points in space from which signal energy radiated to the last named reception points will be received in the said predetermined phase relationship, the curves in each of the several sets representing the intersection with the said hyperboloids of each of several parallel planes at different distances from the foci, and parallel to the line joining them.

3. In apparatus for use in determining the distance at closest approach between two relatively moving objects, the combination with a transmitter carried by a first of said objects for radiating wave form signal energy, of at least three spaced antennas on the second of said objects for receiving the transmitted signal energy, devices for generating, in response to the received signal energy, signals varying significantly upon the recurrence of a predetermined phase relationship between the signal energy received at selected pairs of antennas, and means for recording said last named signals.

4. In apparatus for use in determining the distance at closest approach between two relatively moving aerial objects, the combination with a transmitter carried by a first of said objects for radiating wave form signal energy, of at least three spaced antennas on the second of said objects for receiving the transmitted signal energy, devices on said second of said objects for generating, in response to the received signal energy, signals varying significantly upon the recurrence of a predetermined phase relationship between the signal energy received at selected pairs of antennas, means transmitting to a fixed station said last named signals, and means for recording said last named signals.

5. In apparatus for use in determining the distance at closest approach between two relatively moving objects, the combination with a transmitter carried by a first of said objects for radiating wave form signal energy, of at least three spaced antennas on the second of said objects for receiving the transmitted signal energy, devices for generating, in response to the received signal energy, signals varying distinctively upon the recurrence of a predetermined phase relationship between the signal energy received at selected pairs of antennas, said devices comprising a plurality of electronic circuits, each receiving and compositing the signal energy received by a different pair of antennas, and a plurality of signal generating circuits, each triggered by the output of one of said first named circuits, on occurrence of the said predetermined phase relationship of the signal energy applied thereto, for generating a distinctive signal.

6. In apparatus for comparing the phase of two signals of which the phase relation varies continuously, the combination with a modulator circuit for combining the two signals to produce an output which is a function of the phase angle of the signals, of a trigger circuit responsive to the output of the modulator circuit to produce a signal pulse upon reversal of polarity of the output of said modulator circuit, whereby the relation in time of the signal pulses is indicative of the phase variation between the two signals.

7. In apparatus for comparing the phase of two signals of which the phase relation varies continuously, the combination with a modulator circuit for combining the two signals to produce an output which is a function of the phase angle of the signals, of a trigger circuit responsive to the output of the modulator circuit to emit a signal varying significantly in amplitude whenever the output of the modulator circuit acquires a predetermined value, whereby the relation in time of the amplitude variations of the last named signal is indicative of the phase variation between the two first named signals.

8. In apparatus for use in determining the distance at closest approach between two relatively moving objects, the combination with a transmitter carried by a first of said objects for radiating wave form signal energy, of at least three spaced antennas on the second of said objects for receiving the transmitted signal energy, and devices for generating, in response to the received signal energy, signals varying significantly upon the recurrence of a predetermined phase relationship between the signal energy received at selected pairs of antennas, each of said devices being supplied with signals from the two antennas of a selected pair, each device comprising a modulator circuit for combining the two signals to produce an output which is a function of the phase angle of the signals, and a trigger circuit responsive to the output of the modulator circuit to produce a signal pulse whenever the output of the modulator circuit acquires a predetermined value.

References Cited in the file of this patent

UNITED STATES PATENTS

| | | |
|---|---|---|
| 1,406,996 | Morrill | Feb. 21, 1922 |
| 1,491,372 | Alexanderson | Apr. 22, 1924 |
| 1,723,907 | Alexanderson | Aug. 6, 1929 |
| 1,785,307 | Hammond | Dec. 16, 1930 |
| 2,146,723 | Dunham et al. | Feb. 14, 1939 |
| 2,362,473 | Dunham et al. | Nov. 14, 1944 |
| 2,399,671 | Gage | May 7, 1946 |
| 2,406,953 | Lewis | Sept. 3, 1946 |
| 2,428,966 | Gage | Oct. 14, 1947 |
| 2,448,587 | Green | Sept. 7, 1948 |
| 2,479,567 | Hallman | Aug. 23, 1949 |
| 2,609,532 | Wallace | Sept. 2, 1952 |
| 2,623,208 | Wallace | Dec. 23, 1952 |
| 2,628,836 | Gangel | Feb. 17, 1953 |